US006623317B2

(12) United States Patent
Roycroft et al.

(10) Patent No.: US 6,623,317 B2
(45) Date of Patent: Sep. 23, 2003

(54) POWER TRAIN

(75) Inventors: Terence James Roycroft, Waiuku (NZ); Alan Timothy Gibbs, London (GB)

(73) Assignee: Gibbs Technologies Limited, Jersey (GB)

( * ) Notice: Subject to any disclaimer, the term of this patent is extended or adjusted under 35 U.S.C. 154(b) by 0 days.

(21) Appl. No.: 09/909,114

(22) Filed: Jul. 19, 2001

(65) Prior Publication Data

US 2002/0081917 A1 Jun. 27, 2002

(30) Foreign Application Priority Data

Jul. 21, 2000 (GB) .............................................. 0017785

(51) Int. Cl.⁷ .................................................. B60F 3/00
(52) U.S. Cl. .................... 440/12.54; 114/344; 180/53.1
(58) Field of Search .............................. 180/198, 53.1, 180/53.7, 53.4; 114/344; 440/12.54; 123/179.28; 474/101; 475/154

(56) References Cited

U.S. PATENT DOCUMENTS 3,765,368 A * 10/1973 Asbeck ..................... 440/12.54
4,558,668 A * 12/1985 Yabunaka ............... 123/179.28
4,633,961 A * 1/1987 Niskanen ................... 180/53.7
4,677,866 A    7/1987 Tone .......................... 74/15.86
4,712,636 A * 12/1987 Ishimatsu .................... 114/344
4,723,451 A *  2/1988 Ishimatsu .................... 114/344
5,226,497 A *  7/1993 Beaton ........................ 180/53.4
5,281,188 A *  1/1994 Gillbrand .................... 474/101
5,346,018 A *  9/1994 Koster ........................ 180/53.1
5,358,456 A * 10/1994 Deppert et al. ............. 475/154
6,089,340 A *  7/2000 Galli .......................... 180/53.1

FOREIGN PATENT DOCUMENTS

GB    2 013 595 A    8/1979
GB    2 158 020 A   11/1985
GB    2 245 237 A    1/1992

* cited by examiner

Primary Examiner—S. Joseph Morano
Assistant Examiner—Lars A. Olson
(74) Attorney, Agent, or Firm—Young & Basile, P.C.

(57) ABSTRACT

A PTO (power take off) sprocket 65 driving belt or chain 80 is attached to input shaft 42 of a transversely mounted vehicle gearbox 40. The driving face of sprocket 65 is outside casting 52; its driven part 58 is attached to sprocket 46 by bolts 59, running in bearing 64 in flanged spigot 55. Shaft 42 is driven through sprocket 46 by belt or chain 48. Decouplers may be fitted to wheel drive shafts, and to the PTO drive at 76. FIGS. 3, 4, and 6 show automatic and manual gearboxes mounted alongside engines; FIG. 5 also shows marine jet drive 88, bevel gears 84, and Cardan shaft 82. FIG. 7 shows in-line transmission 240. FIG. 8 shows a sandwich PTO 365 with manual gearbox 341 and clutch assembly 336; or automatic gearbox 341 and torque converter 336. Applications are disclosed to semi-automatic, sequential shit automated manual, and CVT gearboxes.

24 Claims, 7 Drawing Sheets

POWER TRAIN

FIELD OF THE INVENTION

The present invention relates to a transversely mountable power train for a vehicle comprising a power take off, and more particularly but not exclusively to such a transversely mountable power train for an amphibious vehicle. The invention also relates to a vehicle having a transversely mounted power train with a power take off.

1. Description of the Relevant Art

In an amphibious vehicle it is advantageous to use a transverse power train for driving the rear wheels of the vehicle, because the power train does not extend far forward of the rear wheels. The weight of the power train is therefore positioned towards the back of the vehicle, which is necessary for good vehicle performance when the vehicle is in marine mode. Furthermore, the position of the power train maximizes the space available towards the front of the vehicle for the passenger compartment.

In a conventional mid-engined vehicle having a transverse power train, there is usually no power take off. However, in the case of an amphibious vehicle, it is usually necessary to provide power to a marine propulsion unit, for example a water jet or propeller, positioned at the rear of the vehicle, and therefore a power take off is required.

2. Summary of the Invention

It is an object of the invention to provide a power take off from a transverse power train, which is suitable for powering a marine propulsion unit of an amphibian vehicle.

According to a first aspect of the invention, there is provided a power train for a vehicle comprising an engine and gearbox adapted for mounting transversely within the vehicle, characterised in tat a power take off means is mounted to an input shaft of the gearbox for rotation therewith, the power take off means being arranged externally of a casing of the gearbox.

According to a second aspect of the invention, there is provided a vehicle having a power train in accordance with the first aspect of the invention. Preferably the vehicle is an amphibious vehicle and the power take off drives a marine propulsion unit of the vehicle.

BRIEF DESCRIPTION OF THE DRAWINGS

Several embodiments of the invention will now be described, by way of example only, with reference to the accompanying drawings in which.

DETAILED DESCRIPTION

Figure 1:
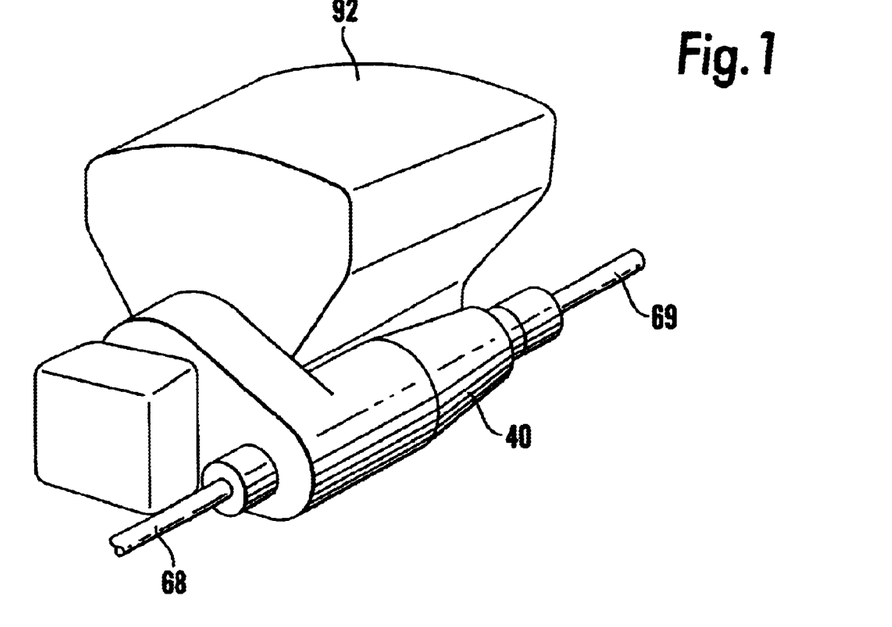
FIG. 1 Is a perspective view of a conventional transverse power train for a vehicle.

FIG. 1 shows a known transverse power train for a vehicle (not shown). The power train comprises an engine 92 and a transmission 40 which provides drive to the rear wheels (not shown) of a vehicle via drive shafts 68, 69. The transmission comprises a gearbox and an integrated final drive unit.

Figure 2:
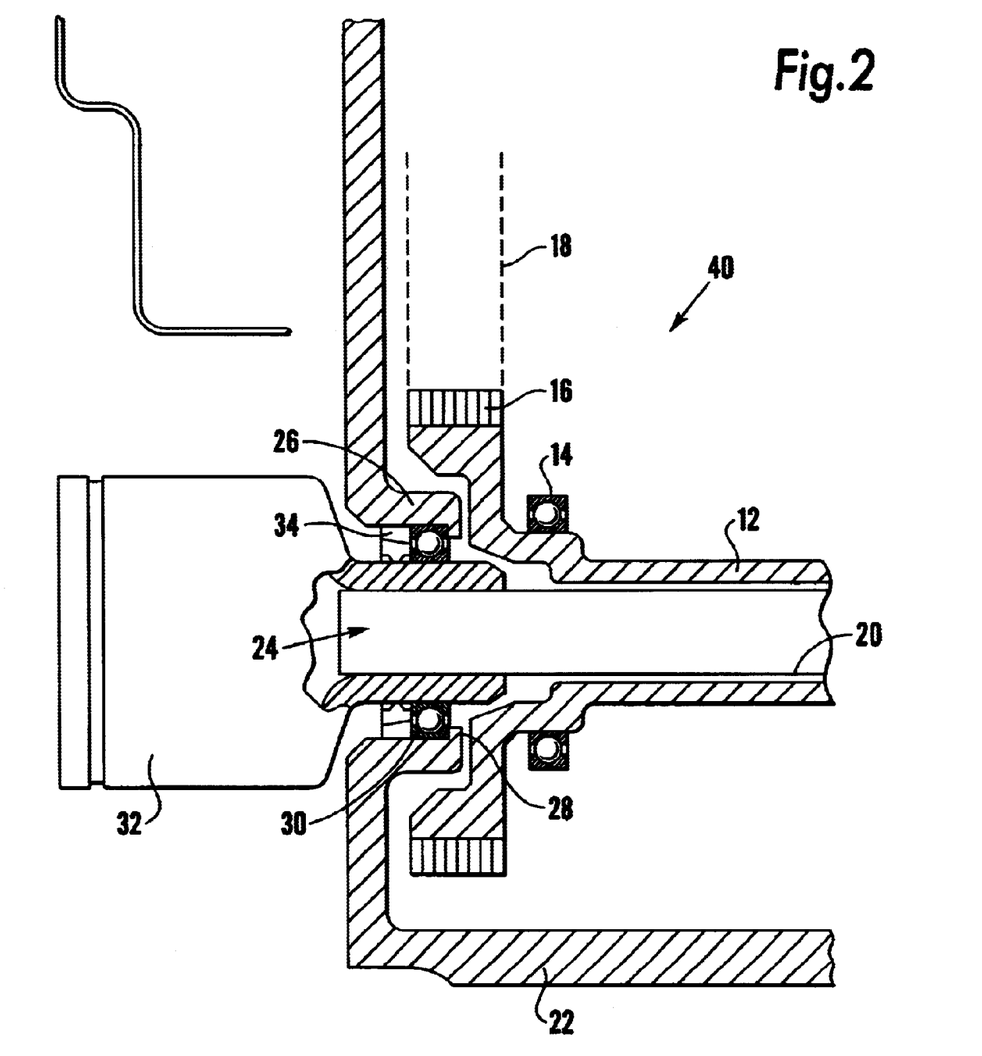
FIG. 2 is a cross-sectional view through part the transmission of the conventional power train of FIG. 1.

FIG. 2 shows part of the transmission 40 of the power train of FIG. 1. A drive tube 12, which is mounted in bearings 14, runs axially of the transmission 40 and provides an input to the gearbox of the transmission. A driven sprocket 16 at one end of the drive tube 12 is connected to a driving sprocket (not shown) which is driven by the engine 92 via a torque converter (not shown), by means of an endless chain or toothed belt 18, shown in dotted outline.

An axle shaft 20 is axially mounted inside, and concentric with, the drive tube 12, and receives power from the final drive (not shown) of the transmission. The transmission has a casing 22, which is apertured at 24, and a circular boss 26 extends into the transmission from the periphery of the aperture 24 The boss 26 terminates in a shoulder 28 which extends into the aperture. Bearings 30, which locate against the shoulder 28, mount the end of the axle shaft 20 in the boss 26 of the casing 22. The axle shaft 20 extends through the aperture 24 and is connected to a constant velocity joint 32 which provides drive to one of the rear wheels of the vehicle (not shown). An oil seal 34 seals between the boss 26 and the axle shaft 20, and protects the bearings 30.

Figure 3:
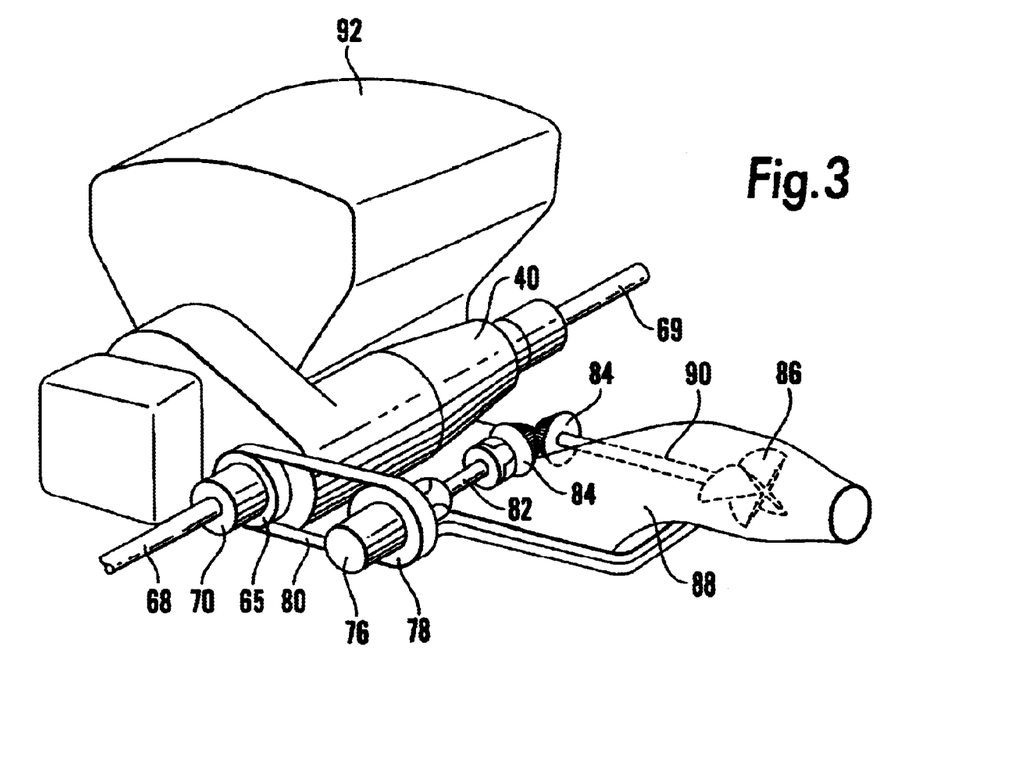
FIG. 3 is a perspective view of a first embodiment of a transverse power train for a motor vehicle having a power take off in accordance with the invention.
Figure 4:
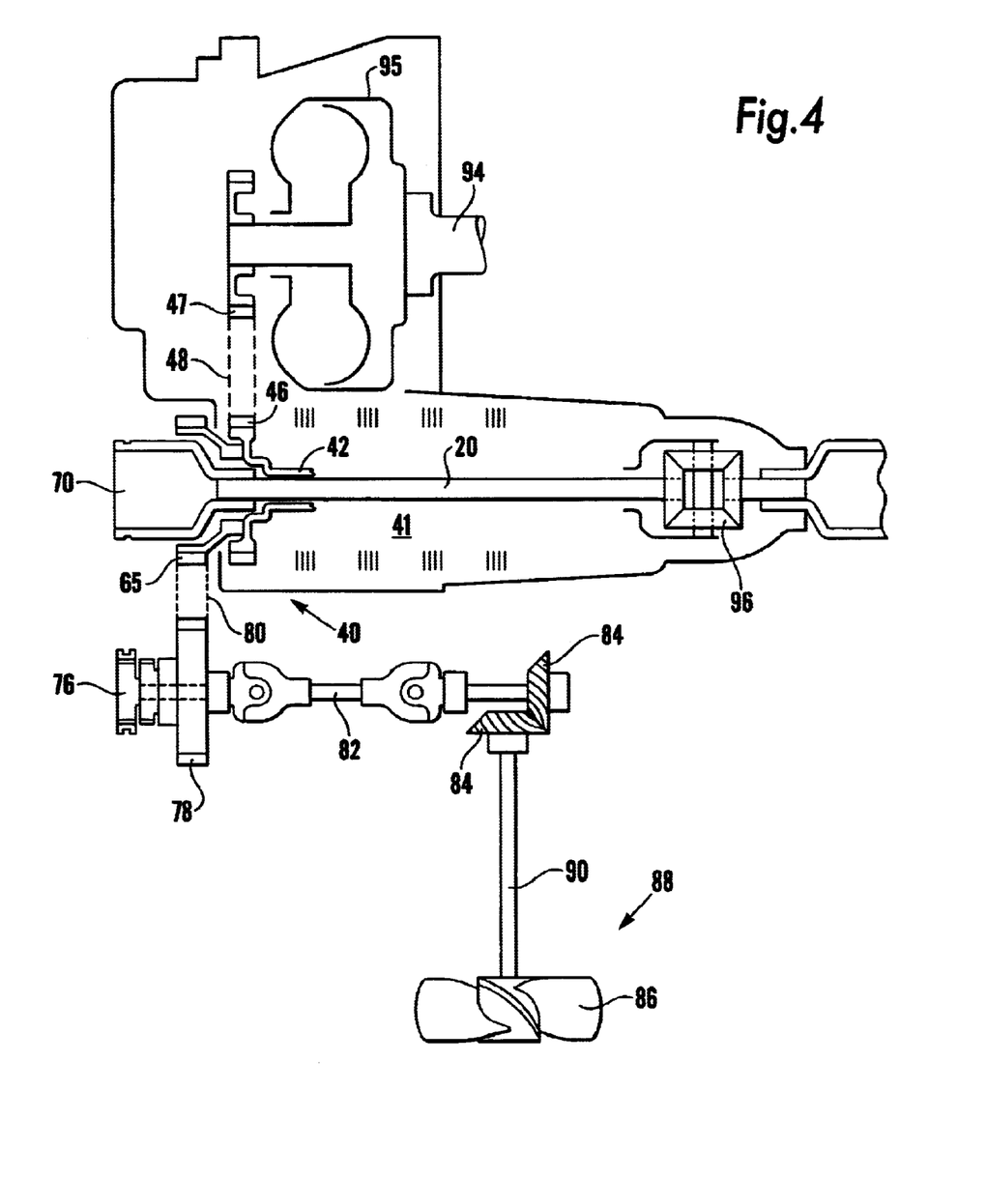
FIG. 4 is a plan view, partly in cross-section, of part of the transverse power train of FIG. 3.

A first embodiment of a transverse power train in accordance with the invention will now be described with reference to FIGS. 3 to 5. Parts in common with the conventional power train of FIGS. 1 and 2 are given the same reference numerals.

The power train is similar to the power train of FIG. 1 and comprises an engine 92 and a transmission 40. The transmission comprises a automatic gearbox 41 and a final drive unit 96 which provides drive to the rear wheels of the vehicle (not shown) via drive shafts 68, 69. The crankshaft 94 of the engine, a part of which can be seen in FIG. 4, is arranged parallel with and overlapping an input shaft, in the form of a drive tube 42, of the gearbox 41. This arrangement is commonly known as a wrap around transmission.

In accordance with the invention, a power take off in the form of a sprocket 65 is secured to the drive tube 42 of the gearbox for rotation therewith. As is shown in FIGS. 3 and 4, the power take off can be used to provide drive to a marine propulsion unit 88 of an amphibious vehicle. In the embodiment shown, the drive is provided via a decoupler 76. The decoupler 76 has a driven sprocket 78 connected to the power take off sprocket 65 by means of an endless belt or chain 80, shown in dotted outline. Alternatively, the power take off could use a gear drive. A cardan shaft 82 connects the drive from the decoupler 76 to a pair of bevel gears 84. An impeller 86 of a jet drive 88 (FIG. 3) is driven by a drive shaft 90 from one of the bevel gears 84.

Figure 5:
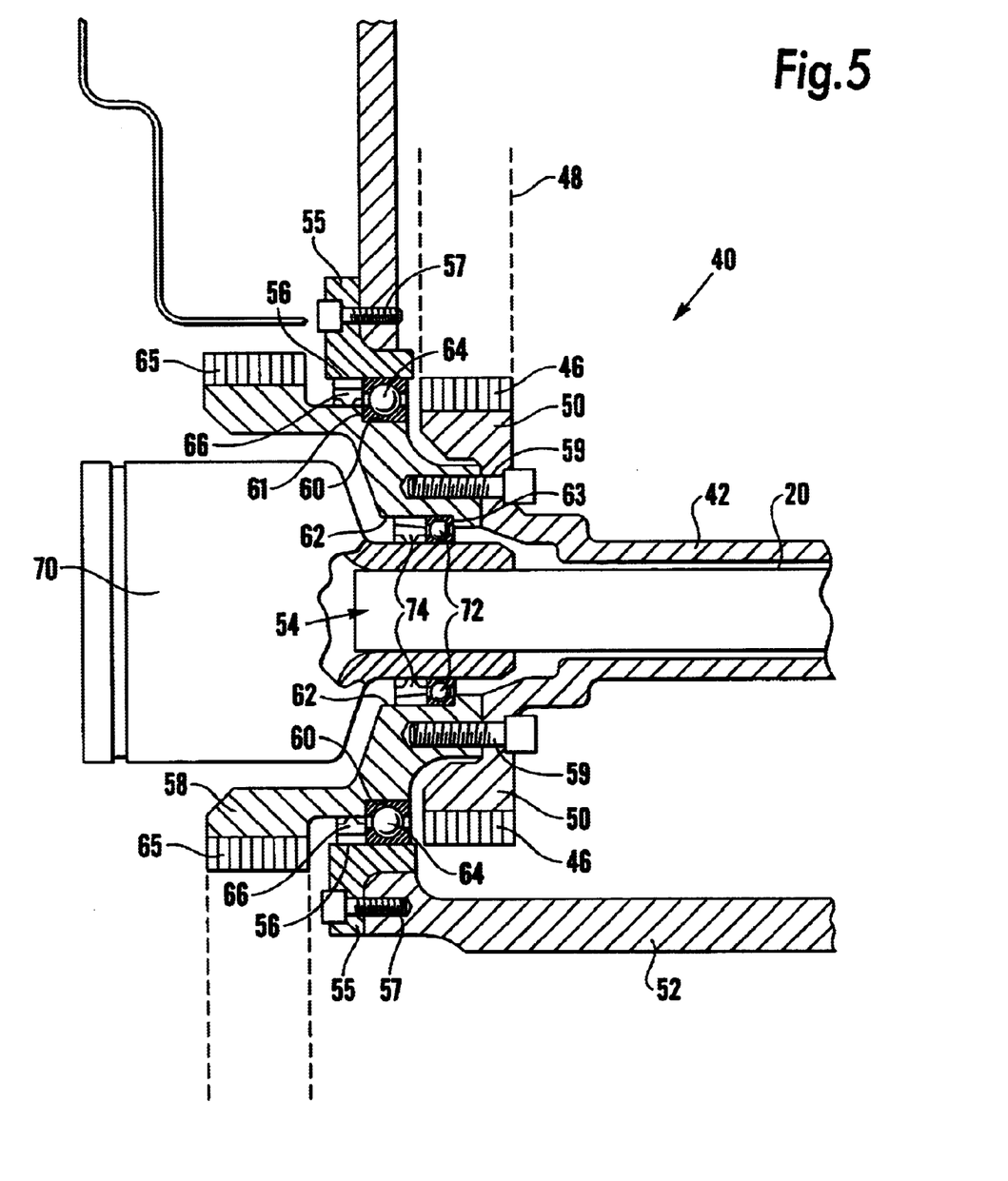
FIG. 5 is a cross-sectional view through part of the transmission of the power train of FIGS. 3 and 4.

The attachment of the power take off sprocket 65 to the input shaft 42 of the gearbox is shown in more detail in FIG. 5 which shows part of the transmission 40. The transmission 40 is similar to the conventional transmission 40 described above with reference to FIG. 2 but has been adapted to provide a power take off. As in the conventional transmission 40 already described, the drive tube 42 runs axially of the transmission 40 and provides drive to the gears (not shown) of the gearbox. A driven sprocket 46 at one end of the drive tube 42 is connected to a driving sprocket 47 (see FIG. 4) by means of an endless chain 48, shown in dotted outline. The driven sprocket 46 is formed on a flange 50 at the left-hand end (as viewed) of the drive tube 42. The driving sprocket 47 is itself driven from the engine via a fluid flywheel such as a torque converter 95.

The transmission 40 is housed in a casing 52 which is modified from the standard casing 22, previously described with reference to FIG. 2. The aperture 24 of the casing 22 is increased in size to form a new aperture 54. The aperture 54 is circular and a flanged spigot 55 with an internal diameter 56 is bolted 57 around the periphery of the aperture 54.

A spacer ring 58 is attached by threaded screws 59 to the flange 50 and extends through the aperture 54. The spacer ring 58 has an external diameter 60, an internal diameter 62 and a power take off sprocket 65 formed on the periphery of the spacer ring 58, in a position outside the transmission casing 52 remote from the flange 50 of the driven sprocket 46.

Bearings 64 locate on the external diameter 60 of the spacer ring 58 and abut a shoulder 61 of the spacer ring 58. The bearings 64 are mounted in the aperture 54 in the casing 52, on the internal diameter 56 of the flanged spigot 55. An oil seal 66 seals the spacer ring 58 against the flanged spigot 55 and protects the bearings 64.

As in the conventional transmission 40, an axle shaft 20 is axially mounted inside, and concentric with, the drive tube 42, and receives power from the final drive 96 of the transmission 40. The axle shaft 20 extends through the aperture 54 and is connected to a constant velocity joint 70, which provides drive to one of the rear wheels of the vehicle (not shown). The spacer ring 58 extends beyond the end of the axle shaft 20, and the sprocket 65 is positioned around the outer casing of the constant velocity joint 70. Although constant velocity joints are shown, other types of articulating rotating joints could be used.

Bearings 72 locate on the internal diameter 62 of the spacer ring 58 abutting a shoulder 63, and mount the end of the axle shaft 20. An oil seal 74 seals between the internal diameter 62 and axle shaft 20 and protects the bearings 72.

Although the power train has been described above as having transmission with an automatic gearbox, this is not essential to the invention and the gearbox can be of any suitable type. For example the gearbox could be a semi-automatic gearbox, a manual change gearbox, an automated manual change gearbox or a continuously variable transmission unit. These types of gearbox are well known in the art and so need not be described in any detail.

Figure 6:
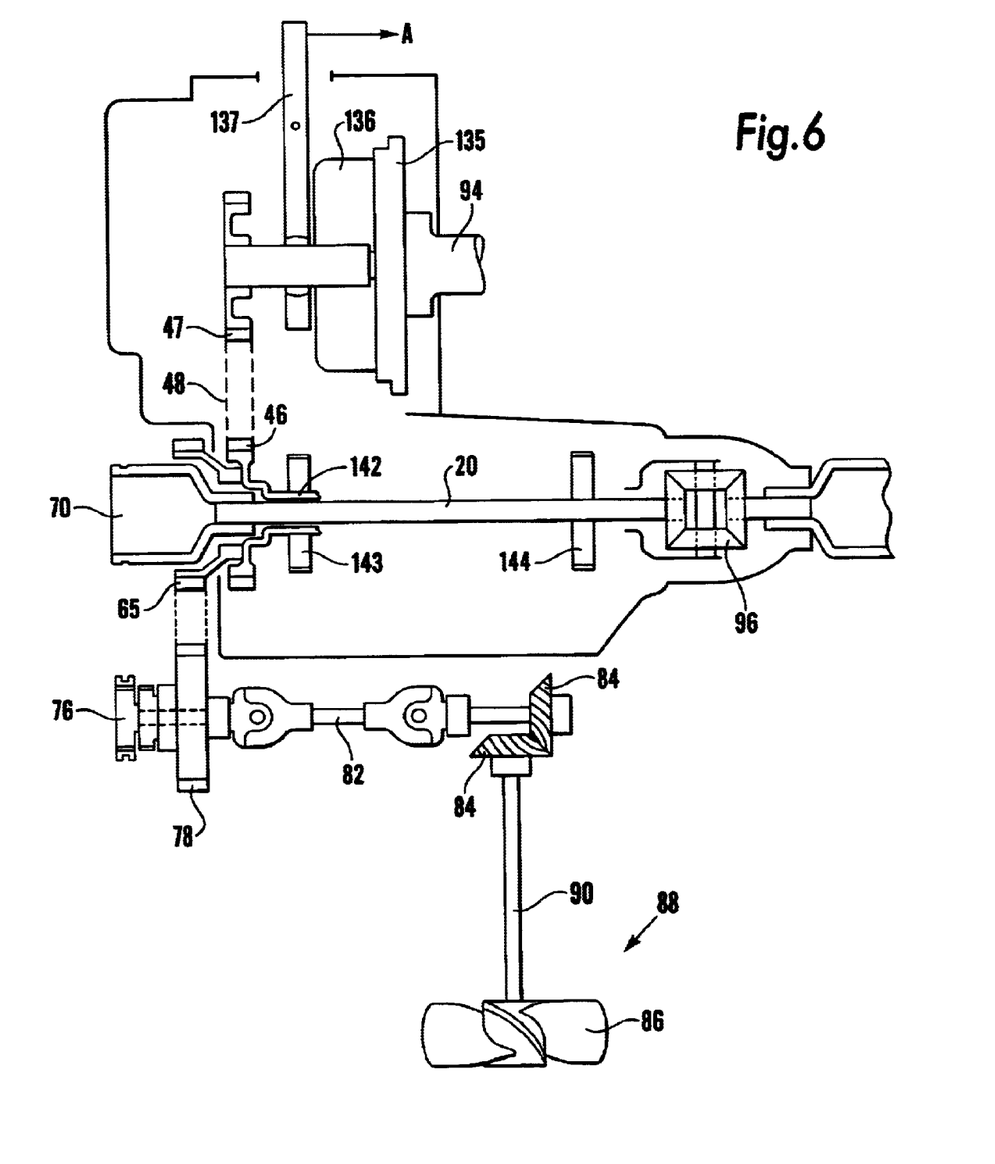
FIG. 6 is a view similar to that of FIG. 4 but showing a modified embodiment in which the transmission comprises a manual change gearbox.

FIG. 6 shows a modification to the first embodiment in which the gearbox is a manual change gearbox. In this arrangement, drive is transferred from the engine crankshaft 94 to the driving sprocket 47 via a flywheel 135 and a friction clutch assembly 136. The friction clutch 136 is disengaged by movement of a release lever 137 in the direction of arrow A. The release lever may be moved manually by a driver of the vehicle in a conventional manner.

Alternatively, the release lever can be moved by means of a hydraulic or electronic actuator when operation of the gearbox and/or the clutch is automated or semi-automated, including sequential shift transmissions, as is known in the art.

A power take off sprocket 65 is attached to the input shaft 142 of the gearbox in a manner similar to that described above in relation to the previous embodiment. The input shaft 142 drives the gearbox via an input gear indicated schematically at 143 whilst an output gear of the gear box is indicated schematically at 144. The construction of the gearbox is otherwise conventional and so is not shown in any detail.

As with the previous embodiment, the power take off can be used to drive the impeller 86 of a marine propulsion unit 88 via a decoupler 76.

Figure 7:
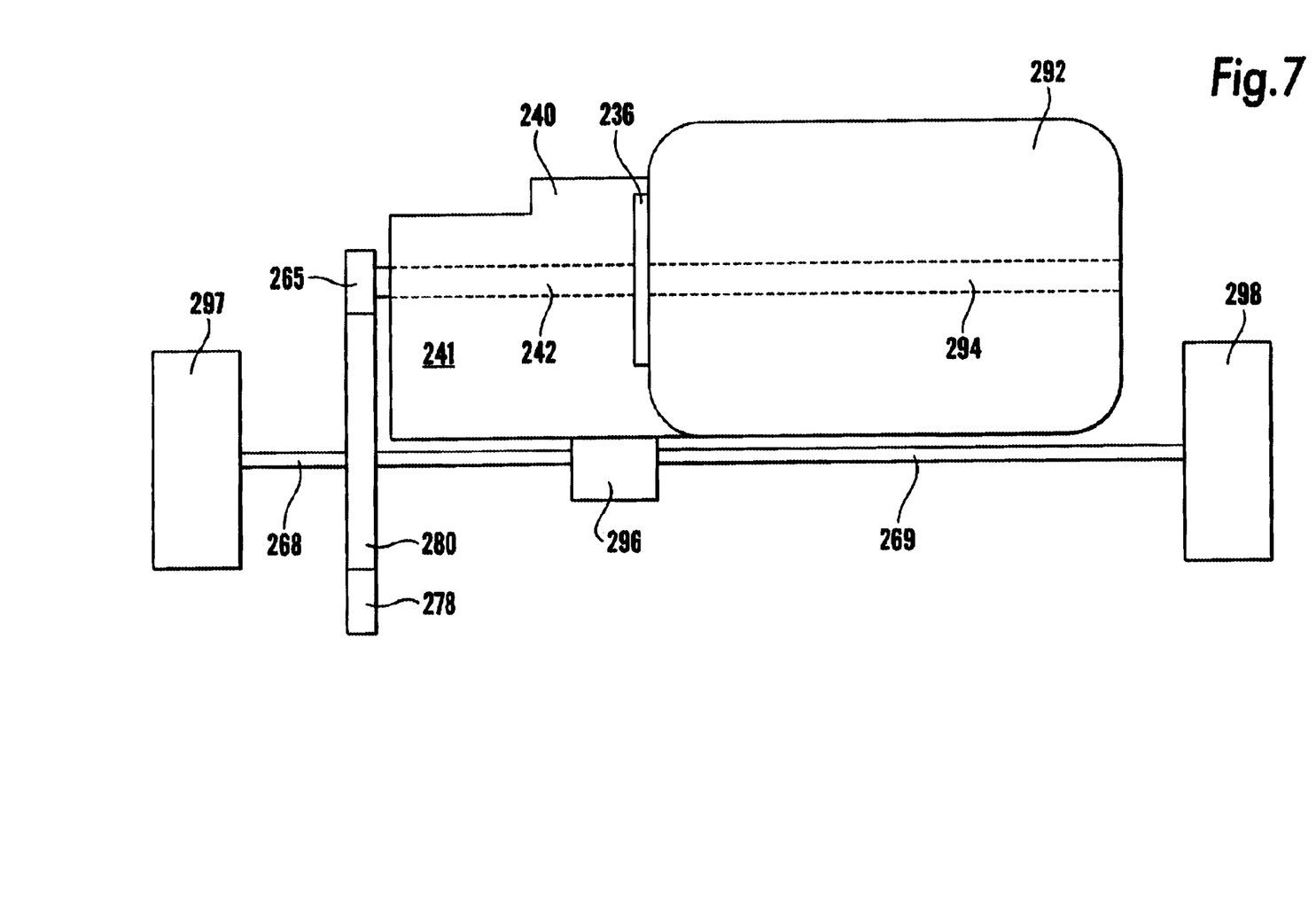
FIG. 7 is a schematic plan view of a further embodiment of a transverse power train with power take off in accordance with the invention.

A second embodiment of a transverse power train with power take off in accordance with the invention is shown in FIG. 7. Parts in common with the embodiment shown in FIGS. 3 to 5 are given the same reference numerals but increased by 200.

In this embodiment, the transmission 240, which comprises a gearbox 241 and a final drive unit 296, is mounted substantially in line with the transverse engine 292. The final drive unit 296 providing drive to left and right wheels 297, 298 of the vehicle via drive shafts 268, 269 respectively. V joints or other articulating rotating joints would normally be required in these drive shafts 268, 269 but are omitted in FIG. 7 for clarity.

Indicated schematically in dotted lines are the crankshaft 294 of the engine and an input shaft 242 of the gearbox 241. The gearbox can be of any suitable type. For example the gearbox may be an automatic, semi-automatic, manual or automated manual gearbox. A drive coupling unit 236 is provided between the engine and the gearbox to transfer drive from the crankshaft of the engine to the input shaft of the gearbox. The drive coupling unit may be a friction clutch or a fluid flywheel depending on the type of gearbox used in the transmission.

In accordance with the invention, a power take off sprocket 265 is mounted for rotation with the input shaft 242 of the gearbox 241. In this embodiment, the power take off sprocket is mounted to the end of the input shaft farthest from the engine. The power take off sprocket may be connected to the input shaft by any suitable means such as by means of a spacer ring (not shown) as described with reference to FIG. 5 above. Those skilled in the art will understand that it will be necessary to provide suitable sealing between the gearbox casing and the input shaft or the power take off sprocket spacer to ensure that fluid within the transmission does not leak out, and bearings will also be necessary to support the input shaft and the power take off sprocket.

The power take off sprocket 265 can be used to provide drive to a marine propulsion unit of an amphibious vehicle in a manner similar to that described above in relation to FIGS. 3 to 5. To this end the power take off sprocket 265 is connected to a driven sprocket 278 of a decoupler by means of an endless chain or belt 280. The decoupler and the remainder of the power take off drive line to the marine propulsion unit have been omitted in this Figure for clarity.

Figure 8:
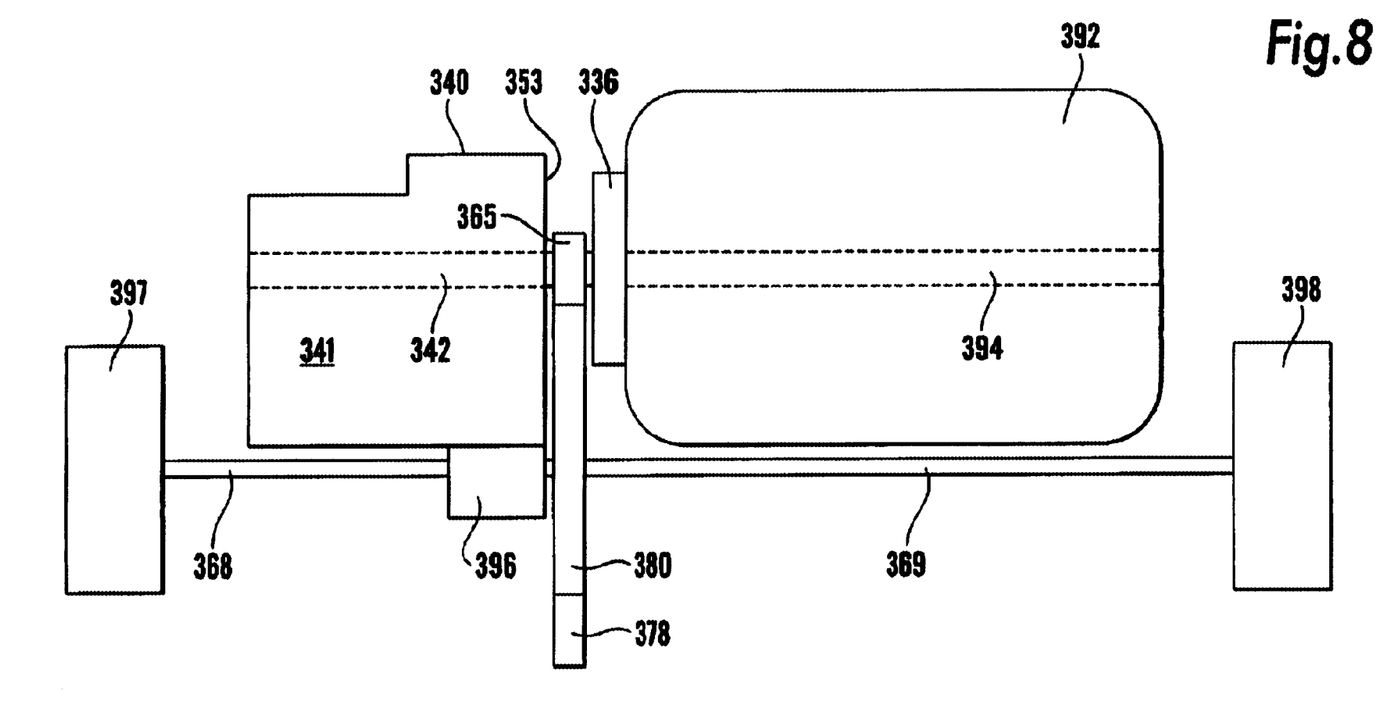
FIG. 8 is a view similar to that of FIG. 7 showing a yet further embodiment of a transverse power train with power take off in accordance with the invention.

A third embodiment of a transverse power train with power take off in accordance with the invention is shown in FIG. 8. Parts in common with the embodiment shown in FIGS. 3 to 5 are given the same reference numerals but increased by 300.

The power train of the third embodiment is similar to that of the second embodiment except that the power take off sprocket 365 in this arrangement is attached to the gearbox input shaft 342 toward the end of the shaft which is closest to the engine. As shown in FIG. 8, the power take off sprocket 365 is attached to the input shaft 342 between an end 353 of the gearbox casing and the drive coupling unit 336. As with the previous embodiments, the gearbox can be of any suitable type, and the drive coupling unit can be a fluid flywheel or a friction clutch as required.

The power take off sprocket 365 can be used to provide drive to a marine propulsion unit of an amphibious vehicle in a manner similar to that described above in relation to FIGS. 3 to 5. To this end the power take off sprocket 365 is connected to a driven sprocket 378 of a decoupler by means of an endless chain or belt 380. The decoupler and the remainder of the power take off drive line to the marine propulsion unit have been omitted for clarity.

Although not shown in FIG. 8, a cowling or bell housing may be provided between the gearbox and the engine to enclose the drive coupling unit 336 and the take off sprocket 365, an opening in the cowling or bell housing being provided to enable the chain or belt 380 to extend outwardly to the decoupler sprocket 378.

The above described embodiments all provide a compact and cost effective means of providing a power take off from a transverse engine and transmission unit which has particular application in an amphibious vehicle where it is necessary to provide drive for a marine propulsion unit.

By providing the power take off from the input shaft of the gearbox, it is possible for the marine propulsion unit to be driven whilst the gearbox is in neutral when there will be no drive to the road wheels. However, in certain gearbox constructions, the input shaft does not rotate when the gearbox is in neutral. In such cases, it will be necessary to have a gear engaged when providing drive to the marine propulsion unit and to provide at least one decoupler in the drive line to the road wheels so that drive to the wheels can be decoupled when the amphibious vehicle is in marine mode. Also, the decoupler on the power take off to the marine drive is not essential to the concept of the invention, and may therefore be omitted and replaced by continuous drive means in road mode.

What is claimed is:

1. A power train for a vehicle comprising an engine having a crankshaft, a gearbox having an input shaft, the engine and gearbox adapted for mounting transversely within the vehicle, and a power take off means mounted to the input shaft of the gearbox for rotation therewith, the power take off means arranged externally of a casing of the gearbox.

2. A power train as claimed in claim 1, in which the gearbox is a manual gearbox or an automated manual gearbox.

3. A power train as claimed in claim 1, in which the gearbox is an automatic or semiautomatic gearbox.

4. A power train as claimed in claim 1, in which the gearbox is a continuously variable transmission unit.

5. A power train as claimed in claim 1, in which the gearbox is mounted substantially parallel to and at least partially overlapping the length of the engine.

6. A power train as claimed in claim 5, in which drive is connected between the crankshaft of the engine and the input shaft of the transmission by means of a driving sprocket arranged to be driven by the crankshaft of the engine and a driven sprocket mounted on the input shaft, the driving sprocket and driven sprocket being connected by a chain or toothed belt.

7. A power train as claimed in claim 1, in which the gearbox is mounted substantially in line with the engine.

8. A power train as claimed in claim 6, in which the power take off is mounted towards an end of the input shaft which is closest to the engine.

9. A power train as claimed in claim 8, wherein the power take off is mounted between an end of the gearbox casing and the drive coupling unit.

10. A power train as claimed in claim 9 in which the drive coupling unit is a fluid flywheel or a friction clutch.

11. A power train as claimed in claim 7, in which the power take off is mounted towards an end of the input shaft which is farthest from the engine.

12. A power train as claimed in claim 1, in which the power take off means is a sprocket for driving a chain or gear, or a drive pulley for driving a belt.

13. A power train as claimed in claim 1, in which the power take off means is axially spaced from the input shaft by a spacer ring.

14. A power train as claimed in claim 13, in which the spacer ring is mounted for rotation in bearings provided in an end of the gearbox casing.

15. A vehicle comprising a power train as claimed claim 1.

16. A vehicle as claimed in claim 15, in which tie vehicle is an amphibious vehicle and the power take off provides drive to a marine propulsion unit.

17. A vehicle as claimed in claim 16 in which the power train is mounted towards the rear of the vehicle to provide drive for the rear wheels of the vehicle.

18. A vehicle as claimed in claim 16, in which the power take off means is connected to a decoupler.

19. A vehicle as claimed in claim 16, in which the decoupler is adapted for coupling and decoupling drive to the marine propulsion means.

20. A vehicle as claimed in claim 16, in which the marine propulsion means is a water jet.

21. A power train for a vehicle comprising an engine and a gearbox adapted for mounting transversely within the vehicle, characterized in that a power take off means is mounted to an input shaft of the gearbox for rotation therewith, the power take off means being arranged externally of a casing of the gearbox and in which the input shaft is in the form of a drive tube.

22. A power train as claimed in claim 21, in which a drive shaft for a road wheel of the vehicle is positioned within the drive tube.

23. A power train for a vehicle comprising an engine and a gearbox adapted for mounting transversely within the vehicle, characterized in that a power take off means is mounted to an input shaft of the gearbox for rotation therewith, the power take off means being arranged externally of a casing of the gearbox and in which the power take off means is axially spaced from the input shaft by a spacer ring and the spacer ring is mounted for rotation in bearings provided in an end of the gearbox casing and the input shaft is in the form of a drive tube and a drive shaft for a road wheel of the vehicle is positioned within the drive tube, the power take off means being spaced from the input shaft by a spacer ring which extends past one end of the drive shaft.

24. A power train as claimed in claim 23, in which the drive shaft is supported by bearings provided on an internal diameter of the spacer ring.

* * * * *